United States Patent [19]

Craig

[11] 3,751,006

[45] Aug. 7, 1973

[54] RANDOM ACCESS TIME-SHARED MICROFORM IMAGE RECOVERY APPARATUS

[76] Inventor: Leonard Jack Craig, 204 S. Anita Ave., Los Angeles, Calif. 90049

[22] Filed: Oct. 12, 1970

[21] Appl. No.: 79,884

[52] U.S. Cl. .......................... 353/25, 353/27, 353/82, 353/99, 355/40, 355/43

[51] Int. Cl.. G03b 23/02, G03b 23/08, G03b 21/28

[58] Field of Search .................. 353/25, 27, 82, 98, 353/99; 355/40, 43

[56] References Cited

UNITED STATES PATENTS

| | | | |
|---|---|---|---|
| 3,528,735 | 9/1970 | Bluitt et al. | 353/27 |
| 3,421,802 | 1/1969 | Irazoqui | 353/25 |
| 3,563,647 | 2/1971 | Kittredge | 355/43 |

*Primary Examiner*—Louis R. Prince
*Assistant Examiner*—Steven L. Stephan
*Attorney*—Smyth, Roston & Pavitt

[57] ABSTRACT

A plurality of random access microform recovery units holding a plurality of separate transparencies in a non-reading position, each transparency at a different serial position along a reading path for light. Each transparency has at least one image for modulating light. A collimated beam of light is directed along the reading path and the path may be moved to a desired one of a plurality of parallel path positions when the transparency contains more than one image. A carrier selectively moves any one of the transparencies at its respective serial position into a reading position wherein the image thereon modulates the light beam. The modulated light beam impinges on a radiation sensor and the image is reproduced thereby as an electronic image signal. The image signal is retained in a buffer channel for conversion to visual information. A plurality of input-/output stations are used to provide for a time-sharing of the random access recovery unit.

8 Claims, 6 Drawing Figures

INVENTOR:
Leonard Jack Craig
By Smyth, Roston & Pavitt
ATTORNEYS

INVENTOR:
Leonard Jack Craig
By Smyth, Roston & Pavitt
ATTORNEYS

INVENTOR:
Leonard Jack Craig
By Smyth, Roston & Pavitt
ATTORNEYS

INVENTOR:
Leonard Jack Craig
By Smyth, Roston & Pavitt
ATTORNEYS

INVENTOR:
Leonard Jack Craig
By Smyth, Roston & Pavitt
ATTORNEYS

RANDOM ACCESS TIME-SHARED MICROFORM IMAGE RECOVERY APPARATUS

BACKGROUND OF THE INVENTION

This invention relates to apparatus for the retrieval of information stored on microforms and, more particulary, to a random access time-shared system for retrieving images stored on microforms.

Various methods and means are known for the retrieval of information stored on microforms. These systems generally employ means to bring the microform or image on a microform into a film gate or object plane of an optical system for optical magnification and subsequent use on the image plane of an optical system. Direct viewing of the magnified image on a rear-projection ground glass screen is a typical use in such a system.

Method and means have also been used to provide sequential, quasi-random, or random access to a particular microimage on a microform. A reel of microfilm, or a cassette containing such a reel, has the microimages arrayed along the length of the film. However, a single reel or cassette at a time is transported to the reading station area and then the reel or cassette is moved or transported again so that a sequential search is made to bring the desired frame or microimage into the film gate (object plane). Thus, two different movements of the microfilm are required to select the desired microimage. Such arrangements do not qualify as a random access system.

Also, a single strip of microfilm has been used in some arrangements wherein any particular frame can be selected within a particular fixed interval of time, hence the use of the term "random access." However, the selected strip must be scanned for the desired microimage so these systems should more properly be termed quasi-random access.

Microfiche and aperture card microforms have been used in various random access methods. However, these methods require first, the transportation of an ensemble of microfiche or of aperture cards from its repository to the reading station and, second, the aligning of the selected region of the microform in the gate for subsequent readout of the microimage.

The aforementioned methods and means for sequential, quasi-random, or random access to a film-type storage and retrieval system require the individual use of the film at a particular user's station during the retrieval, use and restoration intervals. A multiplicity of users generally require a multiplicity of cumbersome viewing (or other) equipment. Also, a multiplicity of users whose requirements do not permit long waiting periods for the stored information, generally require a multiplicity of cumbersome equipment and a replication of the microfilm information.

In summary, there is no known device which can randomly access a particular microimage on different microforms without first, transporting the microform to a reading station and, second, moving the microform until the desired microimage is in the optical object plane (gate) to permit the retrieved information to be used while a multiplicity of other users at other user stations may also have random access to the same or other information in the same store and permit the user of the retrieved information to route the information to other retrieval stations for purposes of individual viewing, making permanent records, or inputting to other devices. The present invention disclosed hereinafter solves the disadvantages of prior art devices and systems and provides means allowing a multiplicity of users at different retrieval stations to have random access to the same microform store without incurring troublesome delays.

SUMMARY OF THE INVENTION

In its broader terms the invention contemplates the direction of a beam of light along a predetermined path from a light source to an image reproducer. A plurality of individual transparencies, having images to be reproduced, are positioned serially along the path with the images normally positioned in a non-reading position out of the path of the beam of light. The transparencies are individually moved into a reading position by bringing the image on one of the transparencies into the path of the beam of light causing the image to modulate the light beam as it is projected onto the reproducer. The reproducer may reproduce the light modulated image in the same form (i.e., optical form). The reproducer may also reproduce the image as an electronic image with analog electrical signals or in coded electrical signals or in some other form of signals, any of which can be used to recreate any image form in the original modulated light.

A preferred embodiment of the present invention utilizes a beam of light with suitable optics such that the beam may be displaced, i.e., the light flux routed, into any one of a plurality of parallel paths. In this manner, one of a number of sub-images on a transparency can be placed in the path of the beam of light and projected to the reproducer. In a specific embodiment of the invention an ensemble of microforms in suitable card holders or carriers are serially arrayed along the path of the displaceable beam and the plane of each microform card is normal to the beam's path. Such a microform may be a microfiche, aperture card, jacketed microfilm or other, and each microform card has rows and columns of submicroforms or microimages. A particular sub-microform may be addressed and, when addressed, results in the simultaneous displacement of the beam into a particular sub-path and the positioning of the particular microform containing the selected microimage into a reading position in the beam's path, thereby causing the selected image to mask the beam and produce a light image which impinges on the reproducer at the beam's terminus.

Preferably, the reproducer may be one or more direct image storing camera tubes (e.g., Permachons), or a vidicon with an electronic image buffer store, such that the retrieval of the microform image on a particular microfilm may be accomplished rapidly, stored for extended use at the terminal, and have the same microform or any other in the store immediately available to any users at any one of a multiplicity of terminals. The light beam impinging on the reproducer may be converted into an electronic image signal to enable suitable transmission means to convey the signals to a remote electronic buffer and viewing monitor. Means may be employed whereby the micorform is electronically enlarged for direct viewing. The transmission means may also convey the signals to a remote hard copy reproducer; further, the transmission means may convey the signals to a remote encoder for further electronic data processing.

The light image, when reproduced as an electronic signal, may be switched to a buffer channel so that the buffer channel retains the image information. This retained image information may now be used for display or other processing without further use of the microform as indicated above. The image on the microform has therefore been reproduced in a single cycle of the decoding appratus and it is now possible to have a time-sharing system using a plurality of input/output stations without an excessive waiting period at any of the stations.

A preferred embodiment of the invention has the means for directing the light beam along a path and the means for actuating the microform cards housed in individual modules. The modules can be stacked together and are constructed so that the path of light can be directed through any of the modules. In this manner it is easy to increase the capacity of the store by adding additional modules. Also, since each module is independent of the others, the modules may contain microforms of different formats so as to provide a mixed format system.

BRIEF DESCRIPTION OF THE DRAWINGS

FIG. 3 also shows a block diagram of the selector for applying control signals to the module;

DESCRIPTION OF THE PREFERRED EMBODIMENT

Figure 1:
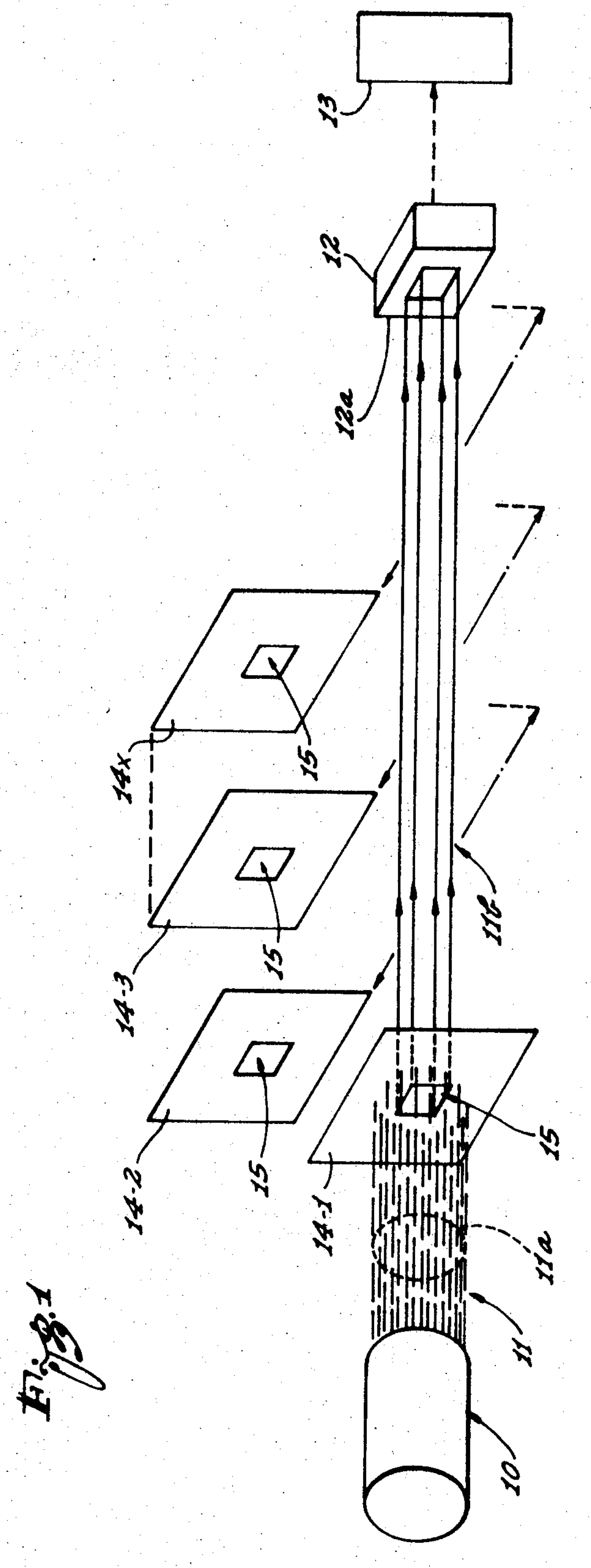
FIG. 1 is a schematic and block diagram of a random access microfilm image recovery system and embodying the present invention.

FIG. 1 shows a schematic and block diagram representation of a random access microfilm image recovery system and embodying the present invention. A source 10 directs a collimated beam of light 11 along a path onto the input sensing surface 12a of an image reproducer 12. The term "reproducer" as it applies to 12 is meant to refer to a device which reproduces any form of modulated light image into visual form, or into an electronic image with analog electrical signals or other coded signals which can later be converted to visual form. The image reproducer 12 may be any one of a number of types depending on the application. For example, it may be a vidicon camera tube and the light images impinging on the surface 12a may be electronically scanned for subsequent electronic enlarging and display on a TV monitor. (Alternatively it may be a photocell or photomultiplier tube when the beam 11 is a sequential ensemble of light pencils or a scanning beam.) Preferably, electronic signals are developed by the reproducer 12 and stored in a buffer memory device 13 for subsequent readout and display. The light beam 11 is actually a beam of light that travels along a predetermined path and fills a volume indicated generally by the dotted outline 11a between the source 10 and the sensing surface 12*a* of the reproducer 12.

Of particular importance to the present invention are a series of spaced apart masks 14 which are held in a carrier 14*a* not shown in FIG. 1) in different serial positions along the light beam path. Each mask is held with its planar surface perpendicular to the light beam path. Each mask 14 contains a transparency 15 with a reproducible image thereon. The mask 14 is normally held (by means not shown in FIG. 1) in a non-reading position with the image on the transparency 15 out of the light beam 11. Means (not shown in FIG. 1) is used to selectively move any one of the masks 14 into a reading position wherein the image on the transparency 15 modulates the light beam 11 causing the modulated light to impinge on the sensing surface 12a of the reproducer 12. Masks 14-2 through 14-X (X representing any arbitrary number) are shown in their normal non-reading position, whereas mask 14-1 is shown in a reading position.

It should be understood that the light beam 11 may be a coherent beam or a non-coherent collimated beam of light and, in either case, the modulated light beam is always in focus on the sensing surface 12a of the reproducer 12. Although the disclosed embodiment is preferred, a source may be used which does not produce parallel rays of light in which case the reproducer will need to have means for an adjustable focal length to image the transparency on its sensing surface.

Figure 2:
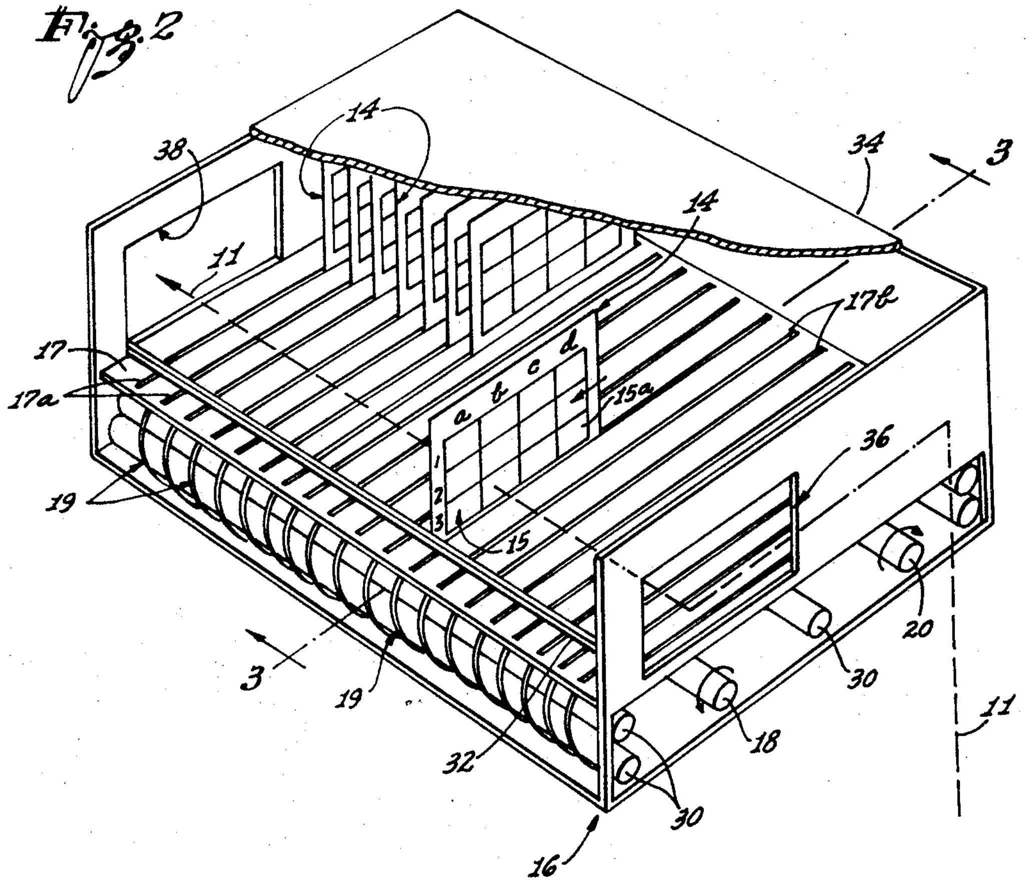
FIG. 2 is an isometric drawing (partially in schematic form) of a microform stroage module for holding masks out of a reading position and for moving the masks into a reading position. The outer enclosure is partially broken away to reveal the interior of the storage module.
Figure 3:
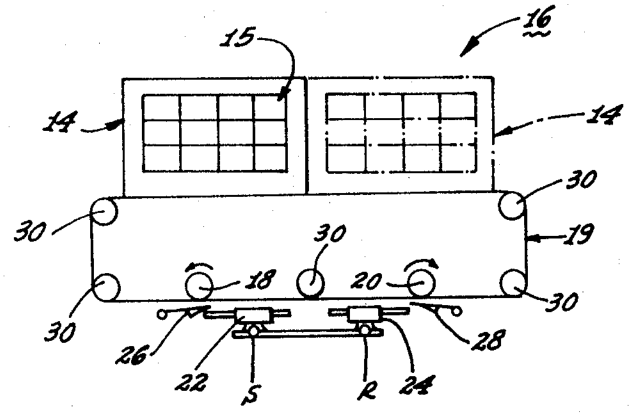
FIG. 3 is a section view of the microform storage module shown in FIG. 2 taken along the lines 3—3.

Refer now to FIGS. 2 and 3 which schematically show a microform storage module 16 for holding the mask carriers 14*a* and the masks 14 and transporting them into the light beam 11 for readout. The micrform storage module 16 has a base structure 17 having a slot 17*a* therein for each mask carrier 14*a*. The masks contain transparencies 15 and are held in carrier frames 14*a*. The slots 17*a* are wide enough to allow the carrier frames of a mask 14 to move along their length. A continuous bank 19 is provided for each slot 17*a* in the microfilm storage module 16 (only part of the bands are shown for illustration). Guides (not shown) retain the bands 19 in line with the corresponding slot 17*a*. Each band 19 is connected to the carrier frame of the corresponding mask 14. The bands 19 pass around smooth guides 30. A select drive roller 18 and a retract drive roller 20 rotate in opposite directions for driving the bands and the connected masks 14 from a non-reading position to a reading position in the microfilm storage module 16. The select and retract drive rollers 18 and 20 are connected by means (not shown) to a motor (not shown) which drives the rollers in opposite directions. The drive rollers 18 and 20 are continuous, passing normal to the slots 17*a* from one end of the storage module 16 to the other.

One set of select and retract solenoids 22 and 24, and one set of select and retract deflectors 26 and 28, are provided for each of the bands 19 in the storage module 16. These devices enable each band to be individually selected to drive a mask 14 into a reading position or be retracted. The solenoid actuators 22 and 24 actuate the corresponding select band deflector 26 and retract band deflector 28, respectively, against a band 19 causing the band to engage the corresponding roller 18 or 20 and drive the band and the corresponding mask into a reading or non-reading position, respectively.

The microfilm storate module 16 has an enclosure 34 (partially broken away in FIGS. 2 and 3) that optically seals off the module from its exterior except for an input opening 36 and an output opening 38. To be explained in more detail hereinafter, in connection with FIGS. 4 and 5, the beam of light 11 passes vertically (as seen in FIG. 2) along the end of the microfilm storage module 16 and a row/column selector deflects the light beam 11 into the input opening 36 and out of the output opening 38 of the storage module 16, to enable a particular microfilm image to be read out. The path of the light beam 11 is illustrated by dashed lines in FIG. 2.

The masks 14 retract until their carriers **14*a* engage the rear end 17*b* of the corresponding slot 17*a* and here are said to be in their normal non-reading position. A mask is moved out until its carrier is positioned against a stop 32, extending transverse to the slots 17*a* and here the mask is said to be in a reading position. When a mask 14 is in a reading position, the microform 15 is in direct alignment between the input opening 36 and the output opening 38, thereby enabling light beam 11, passing between the openings, to pass through the microform 15** and be modulated thereby.

A selector 40 (shown in FIG. 4) is provided for momentarily applying an electrical signal to the select solenoid 22 for a particular band 19 causing the corresponding select band deflector 26 to force the band 19 against the corresponding select drive roller 18, thereby driving the corresponding mask 14 into a reading position. After a predetermined time interval, long enough for any vibrations in the mask to settle out and light flux to be read, the selector 40 actuates the retract solenoid 34 for the same band 19 causing the corresponding select band deflector 28 to engage the band 19 and drive the mask 14 back to its non-reading position. To be explained in more detail in connection with FIG. 4, the selector 40 is actuated under control of mask selection signals (MFS) from an addressing and control unit 64 which selects the particular mask 14 to be read. The signal which energizes a particular select solenoid 22 is represented by S and the signal which energizes a particular retract solenoid 24 is represented by R. The S and R signals for all solenoids 22 and 24 in all microform storage modules (more than one is shown in FIG. 4) are represented by S/R.

Each mask 14 has a transparency 15 (or image) which is divided into rows and columns of subtransparencies **15*a* (or images). By way of example, three rows and four columns of subtransparencies 15*a* are shown on each transparency 15. The rows are numbered 1, 2, and 3,** and the columns are labeled *a, b, c,* and *d.* The row and column selectors (described in connection with FIGS. 4 and 5) are used to deflect the light beam to one, and only one, of the sub-transparencies **15*a* of the transparency 15.**

Figure 4:
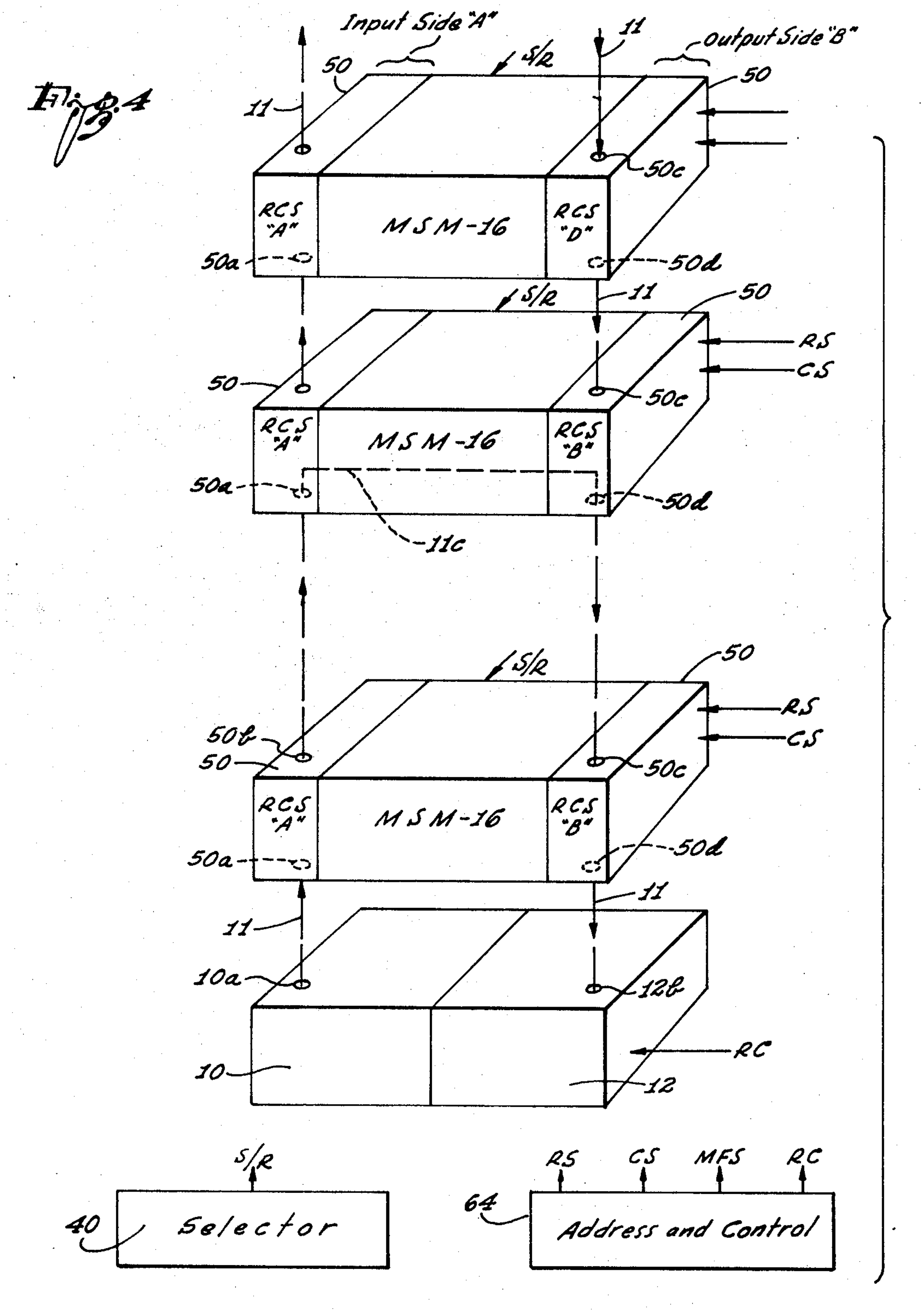
FIG. 4 is a schematic and exploded isometric view of a random access microform storate system and embodying the present invention.

Refer now to FIG. 4. FIG. 4 shows a preferred embodiment of the present invention wherein the microform storage modules 16 shown in detail in FIGS. 2 and 3 are stacked one above the other in a modular arrangement (MSM–16). A separate row/column selectors 50 are positioned on each end of each microform storage module 16 at the input and output openings 36 and 38 of the module 16. The row/column selectors 50 at the input opening 36 are said to be on the input side A (RCS-A), whereas those at the output opening 38 are said to be at the output side B (RCS-B). The stack of microform modules 16 and associated row/column select modules are shown in an exploded view of FIG. 4. At the bottom of the stack of microform storage modules 16 and row/column selectors 50 is the source of light flux 10 and the image reproducer 12.

The configuration of the microform storage modules 16 and the row/column selectors 50 are of considerable importance and should be carefully noted. First it should be noted that the external configuration of each of the modules 16 is identical and the same is true of the row/column selectors 50. It should also be noted that the source of light flux 10 has an opening 10a which is aligned with an input opening 50a and an output opening 50b in each of the stacked row/column selectors 50 in the input side A, allowing the light beam 11 to pass therethrough. It will also be noted that the image reproducer 12 has an input opening **12*b* for the return path of the light beam 11 and it is aligned with an input opening 50*c* and an output opening 50d in each of the row/column selectors 50 in the output side B. This configuration enables the light beam 11 to pass unimpeded up through one row/column selector 50 to the next on the input side A. When a mask 14 is to be read in a particular microform storage module 16, the corresponding row/column selector 50 on both the input and output sides A and B are actuated by the address and control unit 64 and deflect the light beam 11 through such microform storage module 16 and back into the return path for the light beam 11 so that it enters opening 12*b* of reproducer 12. FIG. 4 illustrates this path at 11*c* through the second module 16.**

Thus, it should be noted that the row/column selector 50 on the input side A deflects the light beam from its input or vertical path as seen in FIG. 4 through a storage module 16 where it is modulated, whereas the row/column selector 50 in the output side B deflects the light beam back to a common return path for all modules which finally enters opening **12*b*.** Of considerable importance in the present invention is the symmetry of the system.

Figure 5:
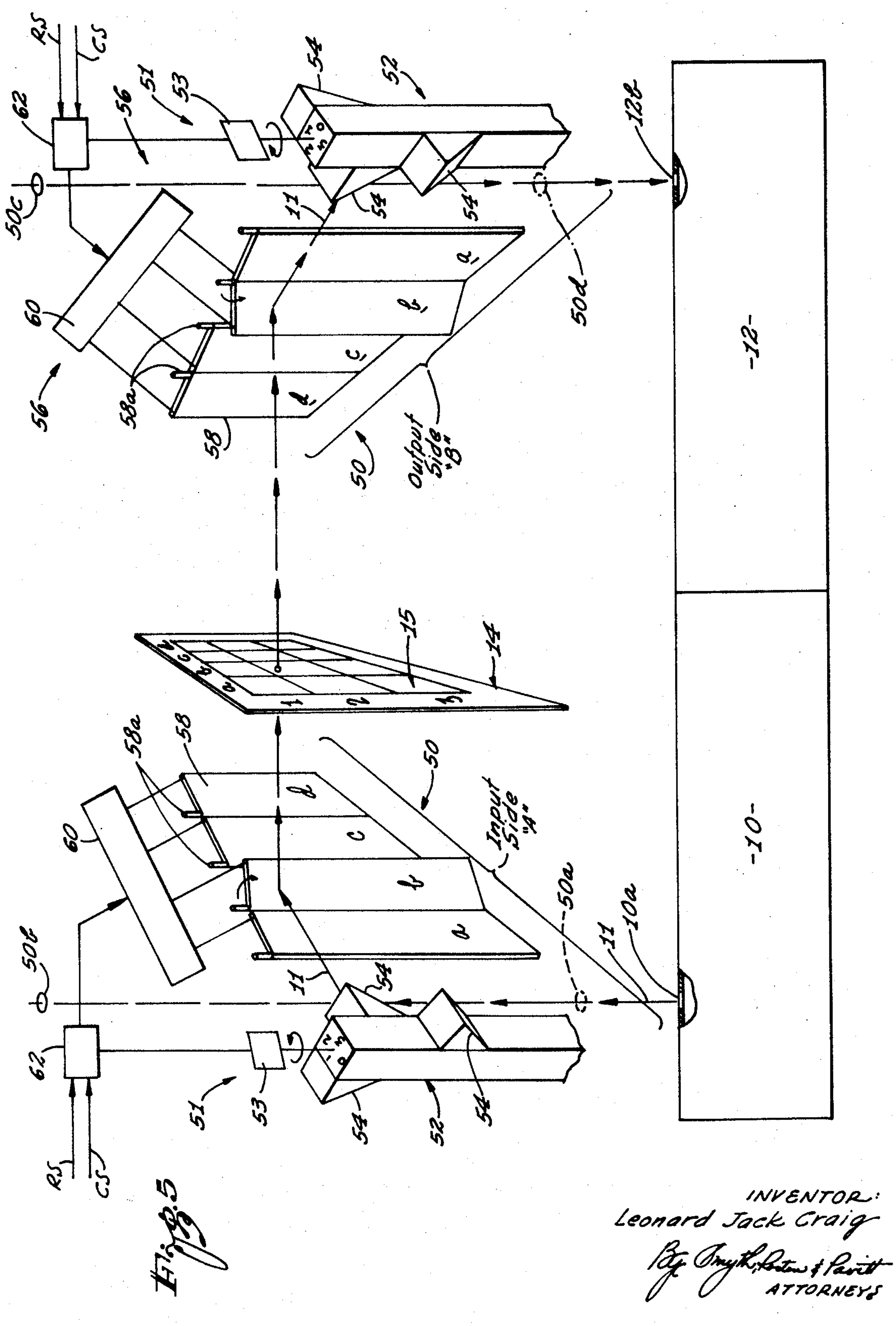
FIG. 5 is partially an isometric and partially a block diagram showing the construction of a row/column selector 50 for the input side and for the output side of the storage system shown in FIG. 4. The source of light flux 10, the reproducer 12 and a typical mask 14 (in a reading position) are also shown to illustrate the interrelationship of the various parts. The enclosures for the selectors 50 are not shown.

Refer now to the detailed schematic representation of the row/column selector as shown in FIG. 5. On the left-hand side of FIG. 5 is shown a typical row/column selector 50 for the input side A and on the right-hand side of FIG. 5 is shown a typical corresponding row/column selector 50 for the output side B. The row/column selector 50 for each side is identical and is essentially a mirror image of the other.

Each of the row/column selectors 50 includes a row selector 51, a column selector 56, and a control unit 62. The row selector 51 includes a rotatable reflector polyhedron 52 and a reflector polyhedron drive unit 53. In this example, the reflector polyhedron 52 has four vertical faces or positions labeled o, 1, 2, and 3. Inclined front surface mirrors (or penta prisms) 54 are placed at different vertical positions on the faces of the reflector polyhedron for positions 1, 2, and 3 but none is provided for position 0. The reflectors 54 for positions 1, 2, and 3 are positioned so that they are in optical alignment with rows 1, 2, and 3, respectively, on the mask 14.

The column selector 56 includes an elongated reflector (or penta prism) 58 for each column of sub-transparencies 15*a* on the transparency 15 and a reflector drive unit 60. The elongated reflector 58 are hinged at 58*a* allowing them to be rotated to a position where they deflect the light beam 11 from the reflector polyhedron 52 through the corresponding column on the transparency 15. The drive unit 60 actuates one, and only one, of the elongated reflectors 58 at a time.

The combination of the reflector polyheadrons 52 and the reflectors 58 on the input and output sides A and B can selectively deflect the light beam 11 and cause the light flux to be routed through a single sub-transparency on the mask 14 and be returned to the opening 12*b*. The control units 62 in the row/column selectors 50 on each side of a common microform storage module 16 are synchronized by row select (RS) and column select (CS) signals from the address and control unit 64. As a result, the control units 62 cause the drive units 53 to drive the two reflector polyhedrons to the same angular position, but of opposite sign, and cause the reflector drive unit 60 to actuate the reflectors 58 corresponding to the same column. This is accomplished by the RS signals which specify the reflector 58 to be actuated.

Thus, following the light flux route for the condition indicated in FIG. 5, the light beam 11 passes out of the opening 10*a* striking the reflector 54 for position 2 in reflector polyhedron 52 on the input side A causing the light beam 11 to be deflected parallel with the plane of the deactuated reflectors 58. However, reflector 58 for column *b* has been actuated which deflects the light beam 11 through the sub-image located at column *b*, row 2. The light flux 11 is modulated by the sub-image and the image flux continues on until it strikes the actuated reflector 58 for column *b* in the row/column selector 50 in the output side B. The modulated beam 11 is now deflected to the reflector polyhedron 52 in the output side B. The inclined reflector 54 for position 2 of the reflector polyhedron deflects the modulated light beam 11 causing it to pass down through the opening 12*b* into the image reproducer 12.

It should now be apparent that the row/column selectors 50 provides a means for routing light flux along any one of a number of sub-paths, each of which is parallel to the other within a storage module, and each of which impinges on one of the sub-images of the transparency 15. Also of importance is that the return path to opening 12*b* is always the same, regardless of the sub-transparency being read out.

Of considerable importance to the overall invention is the fact that within any one of the storage modules shown in FIG. 4 the module contains microforms with the same formats, but the microform formats in other modules may be different. Thus, one microform storage module might have a different number of rows, columns, or both of sub-images from the others. In order to accomodate the different formats, it is only necessary to change the row selector 51 and the column selector 56 to accomodate the corresponding number of rows and columns for each format. However, it is unnecessary to change any of the other row/column selectors 50 or storage modules in the stack since the change in format only affects the light path within the corresponding module and row/column selectors.

Of considerable importance to the overall concept of the present invention is that a plurality of different users can independently and randomly access a particular transparency 15 or sub-transparency and retrieve the image. To this end, an addressing and control unit 64 is shown in FIG. 4 which provides control signals to control the selection and readout of the desired sub-image via signals RS, CS, and MFS. The address and control unit 64 also forms a control signal at RC (reproduce control) after the image is reliably being projected into opening 12*b* which causes the image to be reproduced by reproducer 12.

Figure 6:
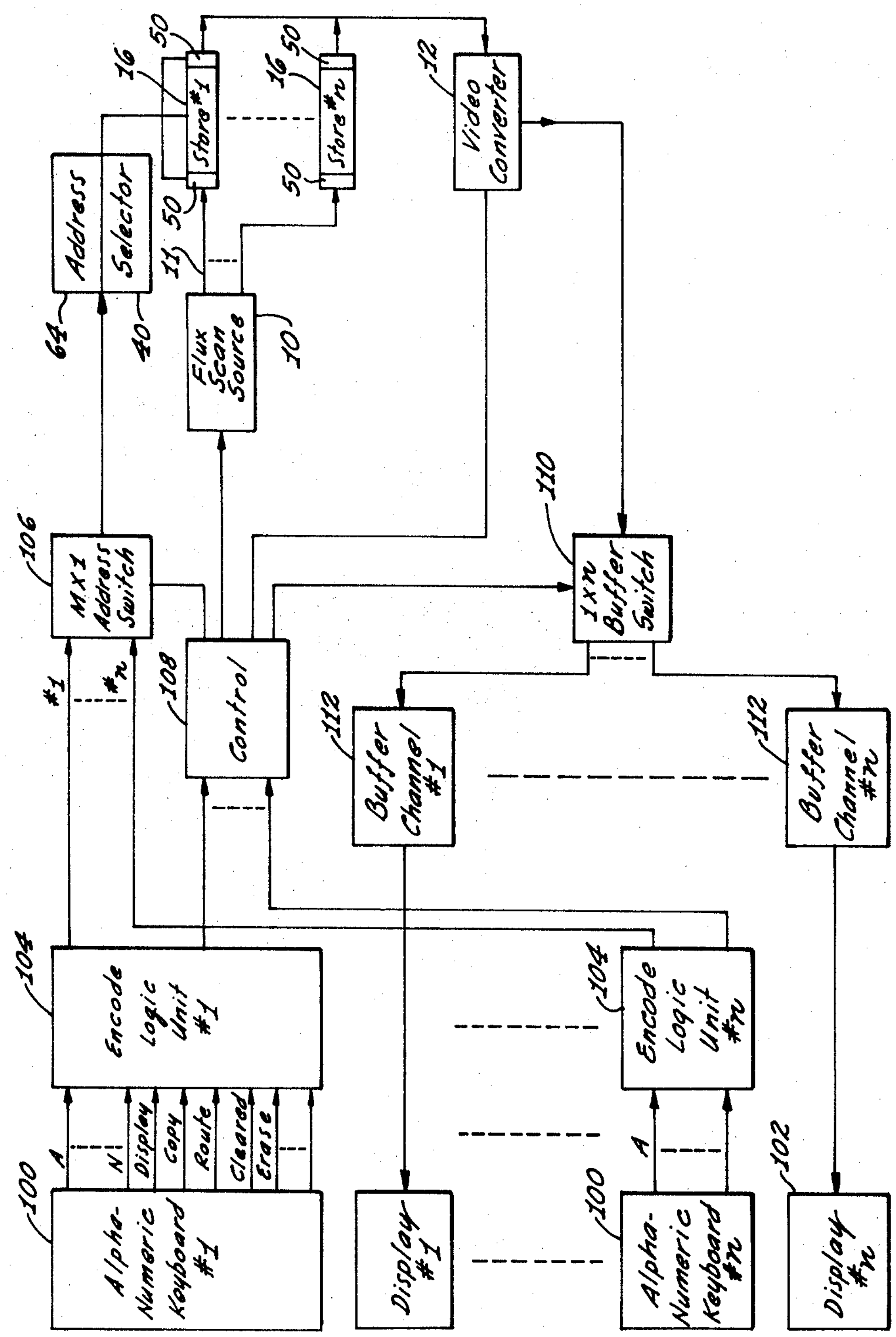
FIG. 6 is a block diagram of the time-shared storage and retrieval system using a plurality of input/output stations.

FIG. 6 illustrates in block diagram form an input and output control and buffer system for use with the storage and retrieval system of the present invention so that the storage and retrieval system may be time-shared between a multiplicity of users. In the system of FIG. 6, the image flux which results from the intersection of the collimated beam of radiant energy and the image on a particular microimage of a microform may impinge on a radiation sensor, such as a video camera tube of other form of electronic sensor. The image flux is converted into an electronic image, or video signal; and one conversion cycle causes the image flux to result in an electronic image signal representative of a full frame of the image.

The electronic signal generated may be switched to a buffer channel which is associated with an output device such as a cathode ray tube (CRT) display. As an alternative, the display itself may have associated with it a buffer. The display or output device would typically be part of a user's terminal and such user's terminal would include an input keyboard and the output device such as the display. The electronic signal in the buffer channel may then continually refresh the terminal output device so that the user has a continued use of the output information without tying up the microform. The buffer is loaded with the electronic image in one conversion cycle 97 and it can be seen that the microform is immediately available for reuse or any other microform is available for use after each cycle of conversion.

As can be seen in FIG. 6, a plurality of keyboards 100, such as alphanumeric keyboards "1" through "*n*" may be provided for a plurality of users at different locations. Associated with each keyboard is an output device such as display units 102 and there would be a corresponding number of "1" through "*n*" displays. Each keyboard may produce a plurality of output signals which are used to address the particular module 16, a particular one of the microforms 14 within the module 16 and a particular row and columns of the image 15 on the microforms 14. The alphanumeric keyboard 100 may also be used to provide control signals as to control the dispensation of the information which is recovered. For example, the information may be displayed, copied, routed, or some other use may be made of the information. The signals from the alphanumeric keyboard 100 are applied to an encode logic unit 104 wherein the location address of the information and the request of the use of such information is encoded and is coupled to an address switch 106 and a control unit 108.

When the control unit 108 contains signals from other encode logic units 104 representing information to be recovered prior to the latest requested information, this condition is designated as a queue in the control. If there is no queue in the control, then the location address and request is gated through the address switch 106 to the address 64 and selector 40. As explained above, the address selector causes the select solenoid 22 in the appropriate module 16 to be energized bringing the carrier 19 containing the desired microform into the readout position for the storage module 16. Also, as the particular one of the select solenoids is energized, the address 64 energizes the pair of row select reflectors 54 and a pair of column select reflectors 58 so that the flux source 10 is directed to the desired sub-portion of the image 15 on the microform 14. This sub-portion of the microform is defined by the alphanumeric location address which is controlled at the keyboard 100 by the user.

It is of considerable importance to note that the module selection, the row select reflector rotations, the column select reflector deflections, and the mask carrier selection occur simultaneously. Hence, the elapsed time due to the mechanical motion in the system is minimized and this results in very fast access of the desired region of an image on the microform.

If there is a queue in the control 108 occasioned by one or more keyboards 100, requesting image information from a particular one of the modules 16 in the store, and such image information has not yet been serviced, then the control 108 provides for a last-in last-out queue control and the request is serviced in a time corresponding to the number of image flux conversion cycles in the queue of the control 108 ahead of that request.

The random access time ($T_a$) is the time interval from initial address request from the keyboard 100 to the display of the image information on the display 102. This access time is subject only to a user's queuing delay ($T_q$). The image displayed may remain on the display 102 either until the image is erased or another image is requested through the use of the buffer. The queuing time $T_q$ is dependent upon the number (N) of user's requesting images from the store at the same time. Therefore, the queuing time is $T_q=(1+N)T_a$. If there is only one user at a time the number of users in the queue is 0 and $T_q$ equals $T_a$.

The control unit 108 generates an activated signal to the flux source 10 so that the flux source provides for the light flux beam 11 to the storage modules 16 for a period corresponding to the time needed for a conversion cycle of the image information. This activating signal for the flux source may be delayed until after the mechanical vibrations in the storage unit have been damped out. These mechanical vibrations may result because of the various mechanical motions necessary to place the desired microform carrier into the optical readout position and also to provide for the various reflectors to provide for the flux to be routed through the desired region of the image on the microform.

At the onset of the conversion cycle for the recovery of the image information, the control 108 opens a buffer switch 110 so that the electronic image from the converter 12 is stored on a particular one of the buffer channels 112 which corresponds to the particular one of the keyboards 100 from which the information was requested. The video converter 12 may produce an end-of- electronic-image signal which is coupled to the control 108 so that the next request in the queue may now be serviced and the request just serviced removed from the queue.

If a display is the mode of information requested, then the buffer channel 112 containing the electronic image of the requested microimage is repeatedly fed to the input of the appropriate one of the display devices 102. In this way the image information is available to the user for an indefinitely long period of time as a result of a single request and conversion cycle. It is to be appreciated that this information held in the buffer channel 112 may be used to provide for a copy or may be routed to other display devices other than the display device 102 associated with a specific keyboard 100. It is also to be appreciated that the display 102 may, in itself, include a buffer as part of the display.

The system of FIG. 6 thereby provides for a time-sharing by a multiplicity of users wherein access time to a particular one of the images stored in a particular one of the modules is minimized since once the image has been recovered, it is immediately placed back in service and is therefore available to request by another user. Also, the recovery system itself is available for use once the image has been recovered and any of the microforms may be requested by any of the users at the different locations.

It should be noted that the mask 14 can be positioned simultaneously with the actuation of the row/column selectors 50 enabling rapid access. Although a preferred embodiment is disclosed herein, the column select could be accomplished by stopping the microform carrier 14 at different column positions eliminating the need for routing the light beam through different columnar paths. Although framed microform masks 14 are shown by way of example, each mask 14 might be an ensemble of cassettes of microfilm or rolls of microfilm which cassettes could be selected as microforms 14 and would be serially fed into the light beam for readout.

It should be further noted that the selector mechanism for the microform storage module depicted in FIG. 2 and FIG. 3 could alternatively employ a gravity powered code-bar selection system and a restore engagement mechanism.

A preferred embodiment of the invention is disclosed. However, changes and variations will occur to those skilled in the art from the teachings herein which will be within the scope of the accompanying claims.

1. A random access microform storage and retrieval system for reproducing images contained on particular ones of a plurality of microforms, including a first group of microforms and with each microform in the first group including a plurality of images located along rows and columns, first means for maintaining the first group of microforms alongside a first light path, a second group of microforms and with each microform in the second group including a plurality of images located along rows and columns, second means for maintaining the second group of microforms alongside a second light path, third means for producing light energy, fourth means receiving the light energy for directing the light energy along the first path and at particular row and column positions and with particular one of the first group of microforms moved into the first light path to modulate the light energy in accordance with the images on the particular one of the first goroup of microforms and at the particular row and column positions, fifth means receiving the light energy for directing the light energy along the second path and at particular row and column positions and with particular one of the second group of microforms moved into the second light path to modulate the light energy in accordance with the images on the particular one of the second group of microforms and at the particular row and column positions, and sixth means coupled to the fourth and fifth means for selectively actuating either the fourth and fifth means for selectively providing the light energy along the first and second paths and at particular row and column positions.

2. The random access system of claim 1 wherein said microforms in the first and second groups are maintained adjacent to each other and in planes and with the movement of the microforms along paths which are at right angles to the path of thdJlight energy.

3. The random access system of claim 1 wherein the light energy is a collimated beam of light.

4. The system of claim 1 additionally including seventh means receiving the light energy along the first path for directing the light energy to a reading position, eighth means receiving the light energy along the second path for directing the light energy to the reading position, and the sixth means coupled to the seventh and eighth means for activating the seventh means simultaneously with the fourth means and activating the eighth means simultaneously with the fifth means.

5. The system of claim 1 wherein the fourth and fifth means include deflectors to provide for the directing of the light energy along the first and second paths at the particular row and column positions.

6. The system of claim 1 wherein the first and fourth means form a first unit and the second and fifth means form a second unit and wherein the first and second units and any similar additional units are capable of being stacked together in modular fashion and wherein each unit has a source path for the light energy from the third means to pass therethrough to the adjacent unit.

7. The system of claim 6 wherein each of the fourth and fifth means includes means for directing the light energy from the source path along the first and second paths and at particular row and column positions to enable the light energy to be modulated.

8. The system of claim 7, wherein each unit has a return path for the light energy to pass therethrough into an adjacent unit and wherein each unit has means to direct the light energy into the return path.

* * * * *